(12) United States Patent
Foresto et al.

(10) Patent No.: US 10,518,869 B2
(45) Date of Patent: Dec. 31, 2019

(54) TURBOPROP

(71) Applicant: Safran Aircraft Engines, Paris (FR)

(72) Inventors: Paul Antoine Foresto, Moissy-Cramayel (FR); Anthony Binder, Moissy-Cramayel (FR); Alexandre Gerard Francois Couilleaux, Moissy-Cramayel (FR); Norman Bruno Andre Jodet, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 76 days.

(21) Appl. No.: 15/547,118

(22) PCT Filed: Jan. 27, 2016

(86) PCT No.: PCT/FR2016/050168
§ 371 (c)(1),
(2) Date: Jul. 28, 2017

(87) PCT Pub. No.: WO2016/120561
PCT Pub. Date: Aug. 4, 2016

(65) Prior Publication Data
US 2018/0009522 A1  Jan. 11, 2018

(30) Foreign Application Priority Data

Jan. 29, 2015 (FR) ..................................... 15 50696

(51) Int. Cl.
*B64C 11/24* (2006.01)
*F01D 5/18* (2006.01)
(Continued)

(52) U.S. Cl.
CPC ................ *B64C 11/24* (2013.01); *F01D 5/18* (2013.01); *F02C 7/04* (2013.01); *B64D 33/02* (2013.01); *F05D 2240/304* (2013.01)

(58) Field of Classification Search
CPC ......... B64C 11/24; B64C 11/02; B64C 11/04; B64C 11/16; F01D 5/18; F02C 7/04; F05D 2240/304
(Continued)

(56) References Cited

U.S. PATENT DOCUMENTS

| 2,622,688 A | * | 12/1952 | Lee | .......................... B64C 11/14 |
| | | | | 416/94 |
| 2,927,647 A | * | 3/1960 | Serriades | ................ B64C 11/24 |
| | | | | 416/21 |

(Continued)

FOREIGN PATENT DOCUMENTS

| DE | 918843 C | * | 10/1954 | ............. F02K 7/005 |
| DE | 2222457 A1 | * | 12/1973 | ............. B64C 11/00 |

(Continued)

OTHER PUBLICATIONS

International Search Report dated Apr. 20, 2016 in PCT/FR2016/050168 filed Jan. 27, 2016.

(Continued)

*Primary Examiner* — Hung Q Nguyen
*Assistant Examiner* — Susan E Scharpf
(74) *Attorney, Agent, or Firm* — Oblon, McClelland, Maier & Neustadt, L.L.P.

(57) ABSTRACT

A turboprop including a propeller including a blade extending in a direction, which also includes a root, a leading edge, a trailing edge, and a wing tip, and an inner air stream channel, wherein the inner air stream channel includes an inlet located at the root of the blade and an outlet leading to the trailing edge of the blade transversely directed in relation to the main elongation direction, such that an inner stream of air flowing in the inner air stream channel by entering via the inlet adjacent to the root of the blade is discharged via the outlet adjacent to the trailing edge of the blade by (Continued)

forming a stream of blown air that moves away from the trailing edge in a direction which is transverse to the main elongation direction and which has a component in the direction of a skeleton line of the blade at the trailing edge.

13 Claims, 5 Drawing Sheets

(51) Int. Cl.
*F02C 7/04* (2006.01)
*B64D 33/02* (2006.01)

(58) Field of Classification Search
USPC .......................................................... 415/90 R
See application file for complete search history.

(56) References Cited

U.S. PATENT DOCUMENTS

| | | | | | |
|---|---|---|---|---|---|
| 2,942,672 | A | * | 6/1960 | Serriades | B64C 11/24 416/21 |
| 3,120,274 | A | * | 2/1964 | Irbitis | B64C 27/18 416/21 |
| 3,262,659 | A | * | 7/1966 | Copeland | B64C 21/04 244/207 |
| 4,607,657 | A | * | 8/1986 | Hirschkron | B64D 33/02 137/15.1 |
| 5,725,180 | A | * | 3/1998 | Chamay | B64D 33/02 244/53 B |
| 5,993,156 | A | | 11/1999 | Bailly et al. | |
| 2007/0116570 | A1 | | 5/2007 | Boury et al. | |
| 2014/0099206 | A1 | * | 4/2014 | Tajan | F01D 5/081 416/95 |
| 2014/0312166 | A1 | * | 10/2014 | Zhu | B64C 27/467 244/17.11 |
| 2015/0260045 | A1 | * | 9/2015 | Chartier | B64C 11/06 416/95 |
| 2015/0300254 | A1 | * | 10/2015 | Stretton | F02C 7/04 137/15.1 |
| 2016/0153467 | A1 | * | 6/2016 | Mahias | F01D 5/186 415/115 |
| 2016/0221273 | A1 | * | 8/2016 | Foresto | F04D 29/684 |
| 2017/0241342 | A1 | * | 8/2017 | Gekht | B64D 33/02 |
| 2018/0016982 | A1 | * | 1/2018 | Wotzak | B64D 27/12 |

FOREIGN PATENT DOCUMENTS

| | | | |
|---|---|---|---|
| EP | 0 887 515 A1 | 12/1998 | |
| EP | 1 741 875 A | 1/2007 | |
| GB | 636.612 | 5/1950 | |
| GB | 2507486 A * | 5/2014 | ............. B64C 11/14 |
| WO | WO-2008113088 * | 9/2008 | ............... F02K 7/00 |

OTHER PUBLICATIONS

French Preliminary Search Report dated Oct. 15, 2015 in Patent Application No. 1550696 (with English translation of categories of cited documents).

International Search Report dated Apr. 20, 2016 in PCT/FR2016/050168 (with English translation of categories of cited documents).

* cited by examiner

TURBOPROP

The present invention relates to turboprops.

More precisely, it relates to a particular structure of a blade of a turboprop propeller of an aircraft.

GENERAL TECHNICAL FIELD AND PRIOR ART

Current turboprops for aircraft, and more particularly turboprops for airplanes, encounter a problem of interference between the propeller of the fan and the air inlet.

In fact, due to integration and mass constraints, these two components are very close to one another, for example on the order of a few centimeters. It will then be understood that the operation of the air inlet is strongly impacted by the passage of the blades in rotation. The same is true for the operation of the propeller which is very locally modified during its passage in front of the nacelle and the air inlet.

The role of the propeller of the fan is to supply a traction force directed toward the front of the aircraft to allow it to compensate for the drag force and thus to move forward. The fan is located upstream of all the rest of the turboprop with respect to the flow of air entering into the turboprop, and is driven in rotation due to the energy recovered at the outlet of the combustion chamber of the turboprop by turbines.

The role of the air inlet, in a turboprop, is to supply the engine with air and to protect it from external attacks. For performance and operability reasons, the air supply must be as homogeneous as possible so as to limit distortion (the gap between the average total pressure and the minimum total pressure). The integration of the air inlet must thus happen while taking into account constraints specific to turboprops, such as the presence of a propeller gearbox (PGB), an engine-nacelle interface, a de-icing system and attention to ingestion constraints.

Attention to these constraints leads to an S-shaped air inlet which is very sensitive to distortion and penalizes efficiency.

The passage of the blades of the fan in front of the air inlet during rotation of the propeller creates a distortion perturbation in the air upstream of the air inlet, but also a drop in the dynamic pressure, also called total pressure, (blade wake). This drop adversely affects the operation and the efficiency of the air inlet by increasing head losses.

The reduction in the efficiency of the air inlet impacts the efficiency of the engine. Reduction in the distortion, for its part, allows an increase in the operability of the compressor of the turboprop. Besides the blade wake, the propeller slightly compresses the flow, so as to increase the dynamic pressure. This compression has a beneficial effect on the operation of the air inlet, but one which is attenuated by the negative effect of the blade wake.

GENERAL PRESENTATION OF THE INVENTION

One general aim of the invention is to propose a solution allowing compensation of the total pressure loss in the wake of the blades of the fan induced by the air inlet. It thus aims to improve the performance of the propeller-air inlet assembly.

More particularly, according to a first aspect, the invention consists of a blade of a propeller of a turboprop extending along a main elongation direction, comprising a root, a wing tip, a leading edge, a trailing edge and an inner air flow channel, characterized in that the inner air flow channel comprises an inlet which is located at the root of the blade and an outlet which leads to the vicinity of the trailing edge of the blade and which is directed transversely to the main elongation direction, so that an inner air flow which circulates in the inner channel while entering through the inlet in the vicinity of the root of the blade is exhausted via the outlet in the vicinity of the trailing edge of the blade, while forming a blown air flow which moves away from the trailing edge in a direction which is transverse to the main elongation direction and which has a component in the direction of a skeleton line of the blade at the trailing edge.

According to an additional feature, the outlet of the inner air flow channel is directed in a direction inclined with respect to the skeleton line of the blade.

According to an additional feature, the inner air flow channel of the blade also leads to the wing tip of the blade, so that a portion of the inner air flow circulating in the inner air flow channel is exhausted via the wing tip of the blade.

According to a particular feature, a platform of the root comprises a scoop, and said scoop is connected to the inlet of the inner air flow channel of the blade, so that an external air flow may penetrate into the scoop, circulate in the inner air flow channel while forming the inner air flow, and be exhausted via the outlet end while forming the blown air flow.

According to another feature, the inner air flow channel comprises several outlets ends distributed along the main elongation direction over a zone of the trailing edge.

According to an additional feature, the blade is composed of a composite material comprising a fiber reinforcement.

According to an additional feature, the outlet leading to the trailing edge is located solely between 0% and 25% of the height of the blade.

According to a second aspect, the invention consists of a propeller comprising a spinner which comprises a nose, characterized in that it comprises a blade according to one of the features mentioned previously.

According to another feature, the propeller comprises:
an air bleed opening located on the nose of the spinner;
a spinner channel which connects the air bleed opening to the inlet of the inner air flow channel of the blade, so that the external air flow can penetrate into the bleed air opening, circulate in the spinner channel and the inner air flow channel while forming the inner flow, and be exhausted via the outlet at the trailing edge of the blade while forming the blown air flow.

According to a third aspect, the invention consists of a turboprop comprising an air inlet which extends along a directional axis and which is formed so that an operating air flow enters into the turboprop, characterized in that it comprises a propeller according to one of the features mentioned previously which rotates around an axis of rotation and which is located upstream of the air inlet with respect to the operating air flow.

According to an additional feature:
the propeller comprises at least one blade which, when said propeller is rotated around the axis of rotation, creates a wake which perturbs the operating air flow at the air inlet;
the outlet is located at the air inlet so that the blown air flow is exhausted at the trailing edge of the blade so as to reduce the wake of the blade at the air inlet.

DESCRIPTION OF THE FIGURES

Other features, goals and advantages of the present invention will appear upon reading the detailed description which follows, with reference to the appended drawings, given by way of non-limiting examples, wherein.

DESCRIPTION OF ONE OR MORE EXAMPLES OF EMBODIMENTS

Figure 1:
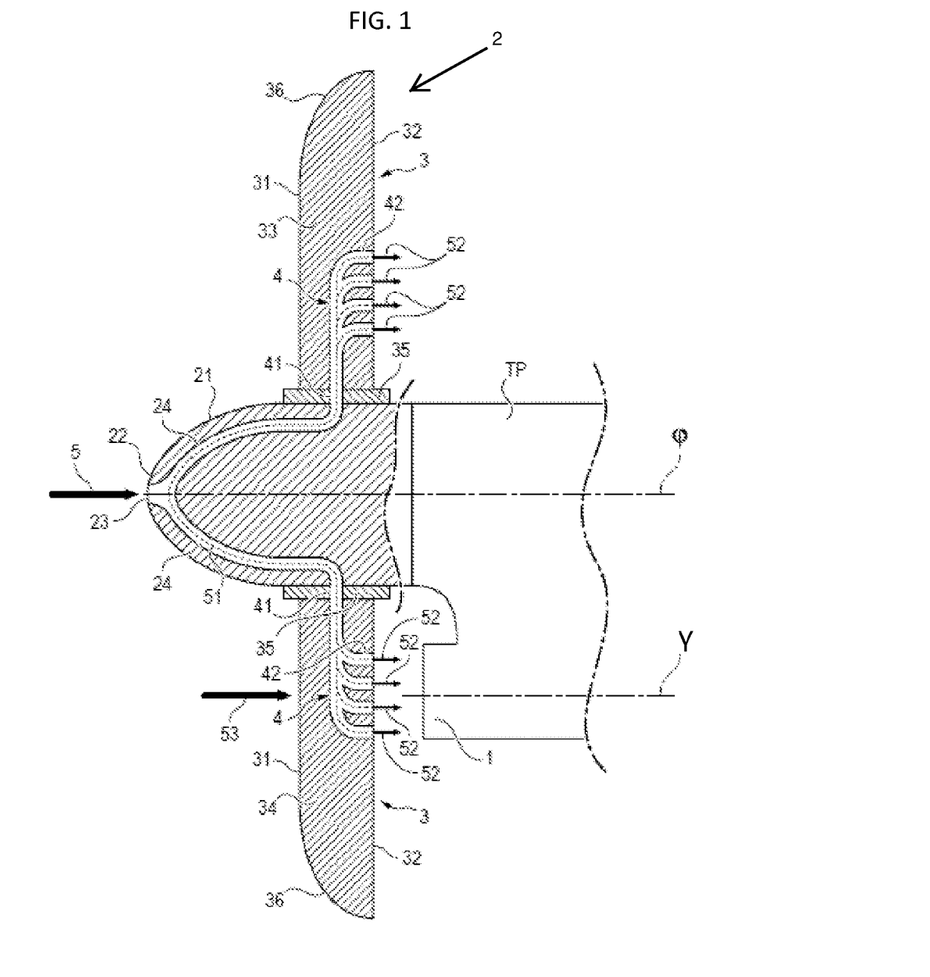
FIG. 1 shows a turboprop according to a first embodiment.

Shown in FIG. 1 are the air inlet 1 and the propeller 2 of the fan of a turboprop TP. Conventionally, when the aircraft is running, an operating air flow 53 is formed and penetrates into the air inlet 1 after having passed through the propeller 2 so as to supply the compressor and the turbine of the turboprop TP. The rotation of the engine shaft of the turboprop TP is transferred to the propeller 2 through a mechanical reducer PGB (not shown) so as to drive the same in rotation around its axis of revolution (axis Φ in the figure).

Figure 2:
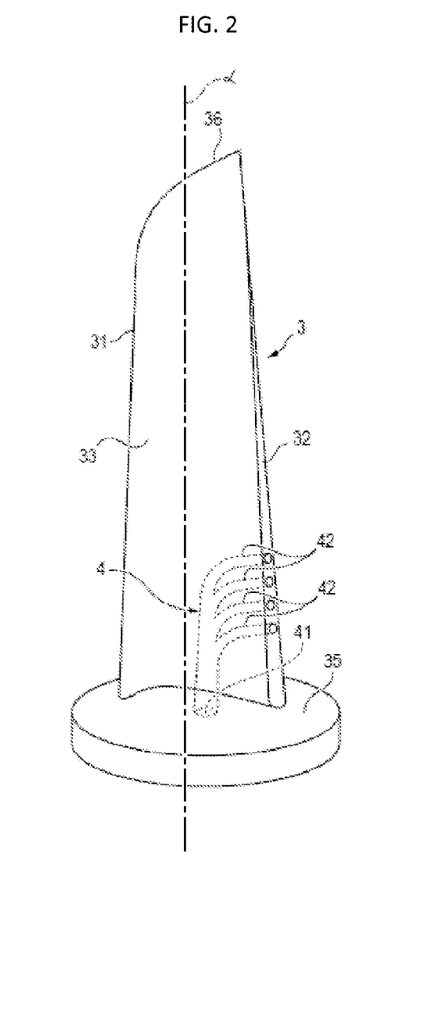
FIG. 2 shows a blade according to the first embodiment.
Figure 3:
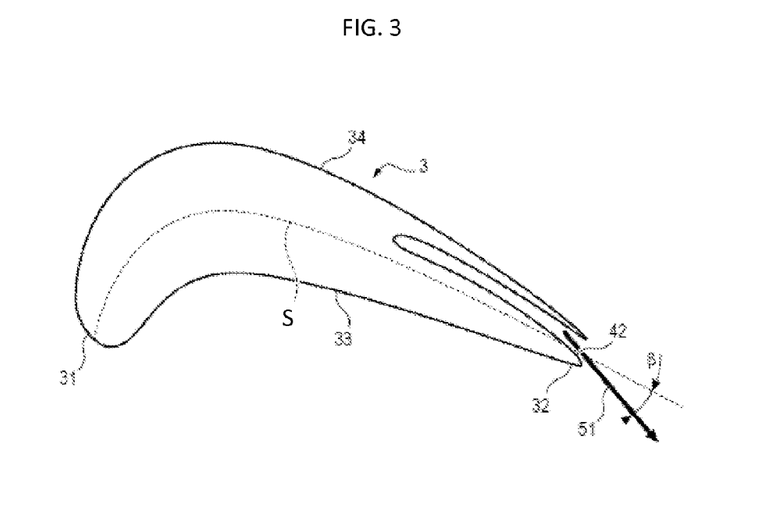
FIG. 3 shows a section view of a blade at an outlet end of the inner air flow channel of the blade according to any embodiment.

The propeller 2 comprises several blades 3 distributed around the axis Φ, each blade 3 extending along a main elongation direction a and having a height, a radius, a leading edge 31, a trailing edge 32, a lower surface 33, an upper surface 34, a root 35, an apex and wing tip 36 (FIGS. 2 and 3). By wing tip 36 of the vane is meant the surface of the apex of the blade 3 for which the blade 3 has its maximum radius.

The propeller 2 also includes a propeller spinner 21 which is centered with respect to the axis of rotation Φ and which has a conical nose 22 arranged upwind of the blades 3. This propeller spinner 21 includes, at its nose 22, an air bleed opening 23 which extends into the interior of the spinner 21 by different spinner channels 24, which make it possible to guide the air entering through the opening 23 to the roots 35 of the blades 3.

For its part, each blade 3 comprises an inner air flow channel 4 which extends, inside said blade 3 from its root 35 to the wing tip 36 of the blade 3.

This inner air flow channel 4 leads to the bottom of the root 35 of the blade 3 through an inlet 41 in the extension of the spinner channel 24 which corresponds to said blade 3.

At its end, this inner air flow channel 4 leads from the blade 3 through one or more outlet(s) 42 which is (are) located at the trailing edge 32 and/or which is (are) located in its immediate vicinity.

This (these) outlet(s) 42 is (are) directed transversely to the main elongation direction a of the blade 3, the axes of these outlets 42 being for example, but not necessarily, perpendicular to the general direction of the trailing edge 32.

In the example of FIGS. 1 to 3, the inner air flow channel 4 comprises four outlets 42 leading from the trailing edge 32 of the blade 3. These outlets 42 are positioned in a zone of the trailing edge 32 potentially at right angle of the air inlet 1 during the rotation of the propeller 2. Thus, the outlets 42 are preferably located between 0% and 25% of the height of the blade 3. They are distributed there while being preferably regularly spaced away from one another. The outlets 42 are preferably located only between 0% and 25% of the height of the blade 3. This makes it possible to reduce the wake of the blade 3 only at right angle of the air inlet 1. What is understood by "between 0% and 25% of the height of the blade 3" is that the outlets 42 are located in a region of the trailing edge 32 starting from the root 35 of the blade 3 which forms a quarter of the total height of said blade 3.

The number of outlets 42 can of course be different: typically from one to ten.

During rotation of the propeller 2, the circulation of air is the following:

an external air flow 5 penetrates into the spinner 21 through the air bleed opening 23 made in the nose 22 of said spinner 21, and thus forms the inner flow 51;

the inner flow 51 circulates in the spinner 21 inside the spinner channels 24, through which it is carried to each of the roots 35 of the blades 3;

the inner flow channel 51 penetrates into the inner air flow channel 4 of each of the blades 3 through its inlet 41;

it is exhausted from each of the blades 3 through the outlet(s) 42 of the inner air flow channel 4, which creates a blown air flow 52 which departs transversely to the trailing edge 32, at the zone thereof which is designed to pass at right angle of the air inlet 1.

The blown air flows 52 thus formed in the wakes of the blades 3 make it possible to limit the unsteady effects connected with the passage of the blades 3 in front of the air inlet 1. The limitation of these effects has the consequence of improving performance of the air inlet 1 by increasing efficiency.

It will also be noted that this also allows an improvement in the acoustic performance of the aircraft, thanks to the reduction:

of the interaction noise between the propeller 2 and the air inlet 1 by reducing the velocity gradient of the operating flow 53 which it reaches the air inlet 1;

of the compressor of the turboprop TP by reducing unsteady load noises created by the wake of the blades 3 in the operating air flow 53;

of the interaction noise between the propeller 2 and the lifting surfaces of the aircraft using the same mechanism as the reduction of the interaction noise between the propeller 2 and the air inlet 1.

Finally, such a solution does not require bleeding a portion of the air at the compressor outlet, a solution which directly reduces the efficiency of the compressor.

The blown air flows 52 have a flow direction transverse to the main elongation axis a of the blade 3 which moves away from the trailing edge 32 and which has a component in the direction of a skeleton line S of the blade 3 at the trailing edge 32, so that they can penetrate into the air inlet 1 and thus limit the pressure drop of the wake of the blades 3 of the propeller 2. In order to give such a direction to the blown air flows 52 at the outlet of the trailing edge 32 of the blade 3, the outlet ends 42 are also directed transversely to the main elongation direction a of the blade 3.

Preferably, the blown air flows 52 have a flow direction which has a main component which is directed in the direction of the skeleton line S at the trailing edge 32, so that the blown air flows 52 are located in the wake of the blade 3 so as to reduce the velocity deficit of the wake of the blade 3.

The blades 3 of the propeller 2 are pivotal with respect to the pitch axis, which is directed in the main elongation direction a in this embodiment, so as to be able to adapt the shape of the propeller 2 during different utilization phases of the aircraft (takeoff, the cruise flight phase . . . ). This possibility of pivoting each of the blades 3 is accomplished by the fact that the root 35 of each blade 3 comprises a platform which forms a pivot with the spinner 21 of the propeller 2. An inclination angle of the blade 3 around the pitch axis, here the main elongation direction a, with respect to its rest position, is called the "pitch angle."

Depending on the pitch angle of the blade 3, the blown air flows 52 direction changes with respect to the directional axis y of the air inlet 1, so that it is possible for the blown air flows 52 not to enter the air inlet 1. Moreover, the variation of the pitch angle of the blade 3 causes the wake angle of the blade 3 to vary.

Thus, in order to ensure, on the one hand, that the blown air flows 52 actually enter the air inlet 1 during the desired utilization phase of the aircraft, for example the cruise flight phase; and on the other hand that the blown air flows 52 are correctly directed into the wake of the blade 3 during said desired utilization phase of the aircraft, as shown in FIG. 3, the blown air flows 52 are directed in a direction inclined by a blowing angle β to the skeleton line S of the blade 3. The skeleton line S of the blade 3 is composed of points which are equidistant from the lower surface 33 and the upper surface 34 of the blade 3. Such a solution makes it possible to maximize the effectiveness of blowing the blown air flows 52 from the trailing edge 32 of the blades 3 during a selected utilization phase of the aircraft. In order for the blown air flows 52 to be directed in such a direction, the outlet ends 42 are directed in a direction inclined by the blowing angle β to the skeleton line S.

The blowing angle β is determined according to the model of the turboprop TP, so that the blown air flows 52 are directed in the direction of the air inlet 1 when the blades pass at right angle of the air inlet 1 during the rotation of the propeller 2 during the desired utilization phase of the aircraft. The blowing angle β is caused to vary depending on the shape of the blades 3, their air inlet 1 position with respect to the propeller 2 and depending on the variation of the pitch angle imposed by the model of the propeller 2 between the different utilization phases of the aircraft. Preferably, the angle β is comprised between −15° and 15°.

Moreover, the inlet 41 of the inner air flow channel 4 is directed along the pitch axis of the blade 3, and therefore, in this embodiment, the inlet 41 is directed along the main elongation direction a of the blade 3. Such a direction of the inlet 41 of the inner channel 4 makes it possible, during rotation of the blade 3 for a pitch change, for the inlet 41 to remain aligned with the spinner channel 24, thus making it possible to continue to ensure the inner flow 51 circulation.

Figure 4:
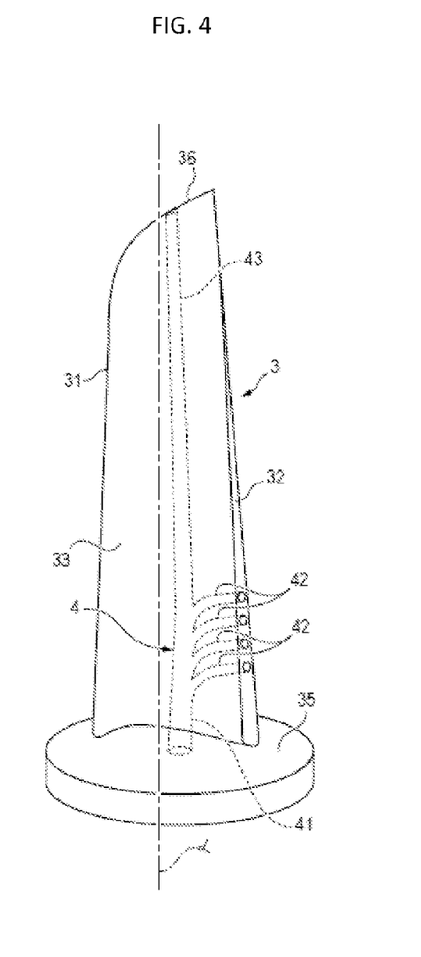
FIG. 4 shows a blade according to a second embodiment.

According to another embodiment shown in FIG. 4, the inner air flow channel 4 of the blade 3 also leads to the wing tip 36 of the blade 3 (wing tip 43 end outlet). This wing tip 43 end makes it possible to exhaust a portion of the internal air flow 51 through the wing tip 36 of the blade 3. The fact of exhausting a portion of the inner air flow 51 through the wing tip 36 of the blade 3 makes it possible to reduce the intensity of the vortex which is created at the wing tip 36 of the blade 3, thus increasing the aerodynamic and acoustic performance of the aircraft. In fact, the vortex which is created at the wing tip 36 of the blades 3 impacts the flow at the lifting surfaces of the aircraft, and more particularly for airplanes.

The portion of the inner air flow 51 which is exhausted at the wing tip 36 of the blade 3 is in particular carried to said wing tip 36 by spinning when the propeller 2 is rotated around the axis of rotation Φ.

Figure 5:
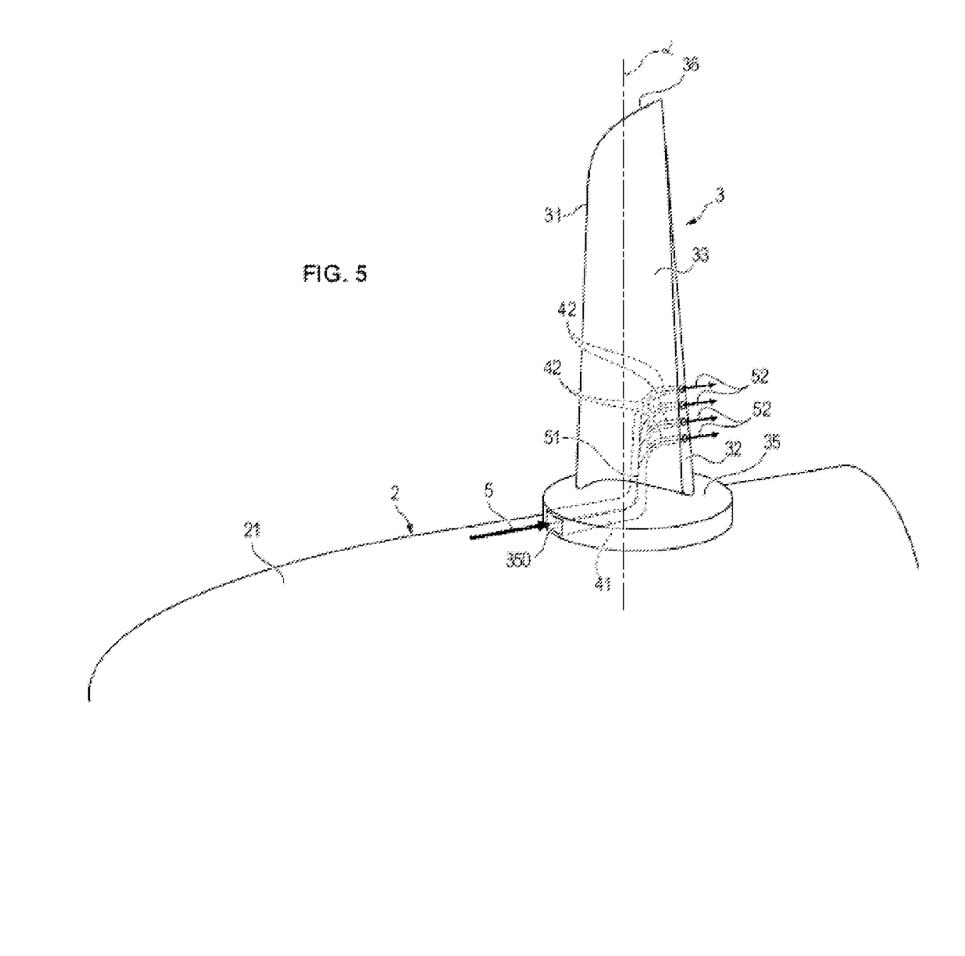
FIG. 5 shows a propeller according to a third embodiment.

According to another embodiment illustrated in FIG. 5, the platform of the root 35 of the blades 3 comprises a scoop 350 which is connected to the inlet 41 end of the inner air flow channel 4. Thus, the external air flow 5 can penetrate into the inner air flow channel 4 of each of the blades 3 by the scoop 350.

The scoop 350 is composed of one or more holes made in the platform of the root 35 of the blade 3, so that the external air flow 5 can penetrate into said holes.

The scoops 350 are formed in the platforms of the roots 35 of the blades 3 so that when the pitch angle of the blades 3 is adjusted for a desired utilization phase of the aircraft, for example the cruise flight phase of the aircraft, the scoops 350 comprise at least one hole which is located facing the external air flow 5 so that the flow rate of the inner flow 51 circulating in the inner air flow channel 4 is a maximum.

According to a possible variant, the blade 3 of the third embodiment can comprises an inner air flow channel 4 which leads to the wing tip 36 of the blade 3 by a wing tip 43 end outlet, thus allowing the exhaust of a portion of the inner air flow 51 by the wing tip 36 of the blade 3.

According to an advantageous variant, the inner air flow channel of the blade 3 comprises a wing tip 43 end outlet as well as outlets 42 leading to the trailing edge 32, solely between 0% and 25% of the height of the blade 3.

The embodiments presented previously can be combined. Thus, the inner air flow 51 circulating in the inner air flow channel 4 of the blades 3 can be formed both by an external air flow 5 which penetrates into the air inlet opening 23 of the nose 22 of the spinner 21, and also by an external air flow 5 which penetrates through the scope 350 created on the platform of the root 35 of the blades 3.

Finally, the blades 3 can be made of a composite material comprising a fiber reinforcement, for example a composite obtained by resin transfer molding with a three-dimensional weave (or 3D® for "three-dimensional Resin Transfer Molding"). Thus, the inner air flow channel 4 of the blades 3 can be created by decomposing certain fibers of the fiber reinforcement, thus creating a cavity inside the blades 3.

More precisely, the inner air flow channel 4 can be obtained according to two possible variants.

The first variant comprises the following steps:

Weaving a plurality of weft yarns and a plurality of warp yarns so as to obtain a fiber blank, said yarns being made of carbon for example. The weft yarns are yarns directed in the main elongation direction a of the blade 3, the warp yarns are yarns directed transversely to the weft yarns. Among the weft yarns and the warp yarns designed to be woven, at least one weft yarn and at least one warp yarn made of carbon is replaced with a yarn designed to form a channel (for example a hollow fiber or an ephemeral fiber which can be eliminated with a suitable treatment). The warp yarn designed to form a channel will thus form a first portion of the inner air flow channel 4 which is directed along the main elongation direction α and which leads to the root 35 of the blade 3 and thus forms an inlet 41. The weft yarn designed to form a channel will thus form a second portion of the inner air flow channel 4 which is directed transversely to the main elongation direction a and which leads to the leading edge 31 and to the trailing edge 32 of the blade 3, thus forming an outlet 42. The warp yarn and the weft yarn designed to form channels intersect and are placed in contact so that the first and the second portion of the inner air flow channel 4 are assembled and lead one into the other.

Forming the fiber blank so as to create a preform of the blade 3.

Densifying the preform by impregnating said preform with a material constituting the matrix.

If the yarns designed to form channels are ephemeral fibers, eliminating said yarns by proceeding with a suitable treatment (such as a thermal treatment or a chemical treatment).

Blocking the second portion of the inner air flow channel 4 at the leading edge 31, for example by mounting an anti-erosion polyurethane film, or by laying a heated de-icing pad on said leading edge 31, or by injection of a resin, or by injection of a resin followed by the laying of a heated de-icing pad on said leading edge 31.

In this first variant, the height at which the inner air flow channel 4 leads to the trailing edge 32 is controlled by selecting the height at which a weft yarn is replaced by a yarn suited to form a channel.

Moreover, in this first variant, it is possible to increase the number of outlets 42 on the trailing edge 32 of the inner flow channel 4 by increasing the number of weft yarns designed to form channels which cross the warp yarn designed to form a channel and which come into contact with it.

The second variant comprises the following steps:

Weaving a plurality of weft yarns and a plurality of warp yarns so as to obtain a fiber blank, said yarns being made of carbon for example. The warp yarns are yarns directed in the main elongation direction a of the blade 3, the weft yarns are yarns directed transversely to the warp yarns. So as to vary the thickness of the fiber blank (and therefore ultimately of the blade 3), the warp yarns are not all woven over their entire length. Thus, certain warp yarns comprise two portions, a first portion which is woven with the weft yarns, and a free, non-woven portion which is designed to be cut. Among these warp yarns designed not to be woven over their entire length, at least one carbon yarn is replaced by a warp yarn suited for forming a channel. This warp yarn designed to form a channel therefore comprises a portion woven with the weft yarns, and a free portion which is not woven. The portion woven with the weft yarns is designed to form a first portion of the inner air flow channel 4 which is directed in the main elongation direction a and which leads to the root 35 of the blade 3 and thus forms an inlet 41.

Folding the free portion of the warp yarn designed to form a channel by lowering it toward the portion of the fiber blank designed to form the trailing edge 32 of the blade 3. Thus, the warp yarn designed to form a channel forms an L which extends from the portion of the fiber blank designed to form the root 35 to the portion of the fiber blank designed to form the trailing edge 32. When the free portion of the warp yarn designed to form a channel is lowered, it can be woven with the warp yarns, or simply be laid on the fiber blank. The free portion of the warp yarn designed to form a channel, thus lowered, will form a second portion of the inner air flow channel 4 which is directed transversely to the main elongation direction a and which leads to the trailing edge 32 of the blade 3.

Forming the fiber blank so as to create a preform of the blade 3.

Densifying the preform by impregnating said preform with a material constituting the matrix.

If the warp yarn designed to form a channel is an ephemeral fiber, eliminating said yarn by proceeding with a suitable treatment (such as a thermal treatment or a chemical treatment).

In this second variant, the height at which the inner air flow channel 4 leads to the trailing edge 32 is controlled by selecting the height at which the warp yarn designed to form a channel is folded.

Moreover, in this second variant, it is possible to increase the number of outlets 42 at the trailing edge 32 of the inner flow channel 4 by increasing the number of warp yarns designed to form channels which comprise a free portion which is lowered.

In the two previously described variants which make it possible to form the inner air flow channel 4 inside the blade 3, so as to increase the diameter of the inner air flow channel, it is possible to use several warp yarns and/or several weft yarns designed to form channels by stacking them so as to increase the diameter of the channel created by the elimination of said yarns.

In the case where the warp and/or weft yarns designed to form channels are hollow fibers, it is possible to increase the diameter of the fibers to increase the diameter of the channels created.

Finally, in the two variants described previously which make it possible to form the inner air flow channel 4 inside the blade 3, it is possible to replace a warp yarn made of carbon by a warp yarn designed to form a channel which will be woven from the portion of the fiber blank designed to form the root 35 to the portion of the fiber blank designed to form the wing tip 36. Such a solution makes it possible to cause the inner air flow channel 4 to lead to the wing tip of the blade 3.

In order to select the materials for the warp and weft yarns, the materials for the warp and weft yarns designed to form channels as well as the treatments for eliminating them, reference can be made to document FR 2 955 609 which describes a method for manufacturing blades made of composite material. Document FR 2 955 609 also describes the weaves usable for the weaving of the yarns.

It is also possible to refer to document WO2006/136755 to select the weave to be used for weaving, document WO2006/136755 teaching other usable weaves.

The invention claimed is:

1. A turboprop comprising:
an air inlet which extends along a directional axis and which is formed so that an operating air flow enters into the turboprop;
a propeller which rotates around an axis of rotation and which is located upstream of the air inlet with respect to the operating air flow; and
a blade which, when said propeller is rotated around the axis of rotation, creates a wake which perturbs the operating air flow at the air inlet, said blade extending along a main elongation direction, said blade comprising
a root,
a leading edge,
a trailing edge,
a wing tip, and
an inner air flow channel which comprises an inlet which is located at the root of the blade and an outlet which leads to the trailing edge of the blade and which is directed transversely to the main elongation direction,
said blade periodically rotating to a position wherein said outlet directly faces the air inlet and wherein a direction of extension of said outlet has a primary component along the directional axis of the air inlet, so that an inner air flow which circulates in the inner air flow channel while entering through the inlet in a vicinity of the root of the blade is exhausted via the outlet in a vicinity of the trailing edge of the blade while forming a blown air flow which moves away from the trailing edge in a direction which is transverse to the main elongation direction so that the blown air flow is exhausted at the trailing edge of the blade so as to reduce the wake of the blade at the air inlet.

2. The turboprop according to claim 1, wherein the outlet leading to the trailing edge is located solely between 0% and 25% of a height of the blade.

3. The turboprop according to claim 1, wherein the outlet of the inner air flow channel is directed in a direction inclined with respect to a skeleton line of the blade.

4. The turboprop according to claim 1, wherein the inner air flow channel of the blade also leads to the wing tip of the blade, so that a portion of the inner air flow circulating in the inner air flow channel is exhausted via the wing tip of the blade through a wing-tip outlet extending in the main elongation direction.

5. The turboprop according to claim 1, wherein a platform of the root comprises a scoop, said scoop being composed of one or more holes made in the platform, so that an external air flow can penetrate into said holes and said scoop is connected to the inlet of the inner air flow channel of the blade, so that an external air flow may penetrate into the scoop, circulate in the inner air flow channel while forming the inner air flow, and be exhausted via an outlet end while forming the blown air flow.

6. The turboprop according to claim 1, wherein the inner air flow channel comprises several outlets distributed along the main elongation direction over a zone of the trailing edge, the outlets being regularly spaced away from one another.

7. The turboprop according to claim 1, wherein the blade is composed of a composite material comprising a fiber reinforcement.

8. The turboprop according to claim 1, wherein the propeller comprises a spinner which comprises a nose.

9. The turboprop according to claim 8, wherein the propeller comprises:
an air bleed opening located on the nose of the spinner;
a spinner channel which connects the air bleed opening to the inlet of the inner air flow channel of the blade, so that an external air flow can penetrate into the bleed air opening, circulate in the spinner channel and the inner air flow channel, while forming the inner air flow, and be exhausted via the outlet at the trailing edge of the blade while forming the blown air flow.

10. The turboprop according to claim 1, wherein the blown air flow is free of air bled from a compressor of the turboprop.

11. The turboprop according to claim 8, wherein a platform of the root comprises a scoop, said scoop being composed of one or more holes made in the platform, so that an external air flow can penetrate into said holes and said scoop is connected to the inlet of the inner air flow channel of the blade, so that an external air flow may penetrate into the scoop, circulate in the inner air flow channel while forming the inner air flow, and be exhausted via an outlet end while forming the blown air flow, wherein the platform forms a pivot with the spinner of the propeller around a pitch axis.

12. The turboprop according to claim 11, wherein the inlet of the in air flow channel is directed along the pitch axis of the platform of the root.

13. The turboprop according to claim 6, wherein the outlets have a circular shape.

\* \* \* \* \*